United States Patent

[11] 3,612,670

| [72] | Inventor | Donald R. Phillips |
| | | 1809 Mira Vista, Santa Barbara, Calif. |
| [21] | Appl. No. | 790,571 |
| [22] | Filed | Jan. 13, 1969 |
| [45] | Patented | Oct. 12, 1971 |

[54] METHOD OF PRODUCING EDUCATIONAL MOTION PICTURES
7 Claims, 3 Drawing Figs.

[52] U.S. Cl. .................................................. 352/5, 35/35 C, 84/470, 352/39
[51] Int. Cl. ........................................................ G03b 31/02
[50] Field of Search ........................................... 352/5, 38, 39; 353/121

[56] References Cited
UNITED STATES PATENTS

| 1,323,943 | 12/1919 | Wilcox | 352/39 |
| 1,778,104 | 10/1930 | Conkie | 352/39 |
| 1,930,552 | 10/1933 | Conkie | 352/39 |
| 2,071,044 | 2/1937 | Savage | 352/5 |
| 3,016,792 | 1/1962 | Payne | 352/39 X |

Primary Examiner—Louis R. Prince
Assistant Examiner—Joseph W. Roskos
Attorney—Robert E. Geauque ABSTRACT: A method is described for making sound motion pictures which are to be used for musical appreciation and other musical education purposes. The film production is based on the matching of pictures to an unaltered musical composition. Various types of scene sequences are filmed and synchronized with certain sequences of bars of the music, having a certain instrumental sound. The method of the invention is aided by graphical techniques whereby the bars of the music having a (1) certain instrumental sound are keyed to a chart which lists time of music, (2) instrumental sound, (3) typical bar, and (4) typical frame.

DONALD R PHILLIPS
BY R. E. Geangue
ATTORNEY

METHOD OF PRODUCING EDUCATIONAL MOTION PICTURES

BACKGROUND OF THE INVENTION

1. Field of the Invention

This invention relates to a sound motion-picture production method, and more particularly, to a method and technique for making educational films of the type used in teaching music and music appreciation.

2. Description of the Prior Art

The conventional technique of film music comprises the filming of a dramatic or pictorial sequence and thereafter arranging music to conform to the desired mood of the filmed scene. The music is scored so as to permit its synchronization with the action of the picture. That is, the music is made complementary to the pictorial presentation. The music is ancillary to the picture and "points," underlines, links, emphasizes, or interprets the action, becoming part of the dramatic pattern of the film's structure.

In summary, when music and pictures are combined the music is added to the film. However, there are certain educational situations where it is desired to present a particular musical composition to the student. Such films are usually referred to as a "filmed concert" of performed music. This may be, for example, a classical orchestral composition, choral work, or other important musical creation. Heretofore, when it has been desired to present such a musical work on the motion-picture screen, for use in musical education, it has been customary to simply film the orchestra or artist performing the work. Occasionally, the scenes of the orchestra, conductor and individual artists are intercut with other pictorial scenes to dramatize the music. However, no integrated audiovisual technique has been proposed heretofore for optimizing the learning experience and the teaching situation, so as to psychologically benefit from the emotional response of the student and thereby develop optimal learning, appreciation, and understanding of music.

SUMMARY OF THE INVENTION

The present invention comprises a technique and method of making an educational sound motion-picture film for teaching students a particular musical composition. The film produced by the method of the invention impresses the music on the mind of the student by visual association of the music and action on the motion-picture screen. Although the broad concept of utilizing pictures coordinated with sounds for instructing any subject is recognized as being old and well known in the art, the method of the present invention employs novel steps and techniques heretofore not employed in musical education. That is, in the present invention a sound track carrying the recorded score of the musical composition is the known starting quantity, and the pictorial portion of the film is produced to express the music.

Starting with the musical composition, a series of individual shots, expressing the mood, motion, and tempo of the score are planned and listed on a chart developed especially for carrying out the method of the invention.

Depending on the nature of the music, various scenic and pictorial representations are developed wherein the film develops a visual expression of a series of musical thoughts. These may be considered as discrete or "severable" musical themes.

The complete inherent technical facilities of the motion-picture medium specifically and visually express the mood, motion, and tempo of any musical composition to create an educational tool.

It is, therefore, an object of the invention to provide a novel and improved method of making educational sound motion-picture films which are to be used for the purpose of teaching music appreciation.

It is another object of the invention to provide a novel and improved technique for the production of a motion picture which conforms with a given musical score.

Yet another object of the invention is to record a musical score and thereafter develop and produce a motion-picture pictorial representation which is combined with the recorded musical score.

These and other objects of the invention will be made apparent to those versed in the art upon consideration of the following specification.

DESCRIPTION OF THE PREFERRED EMBODIMENT

Figure 1:
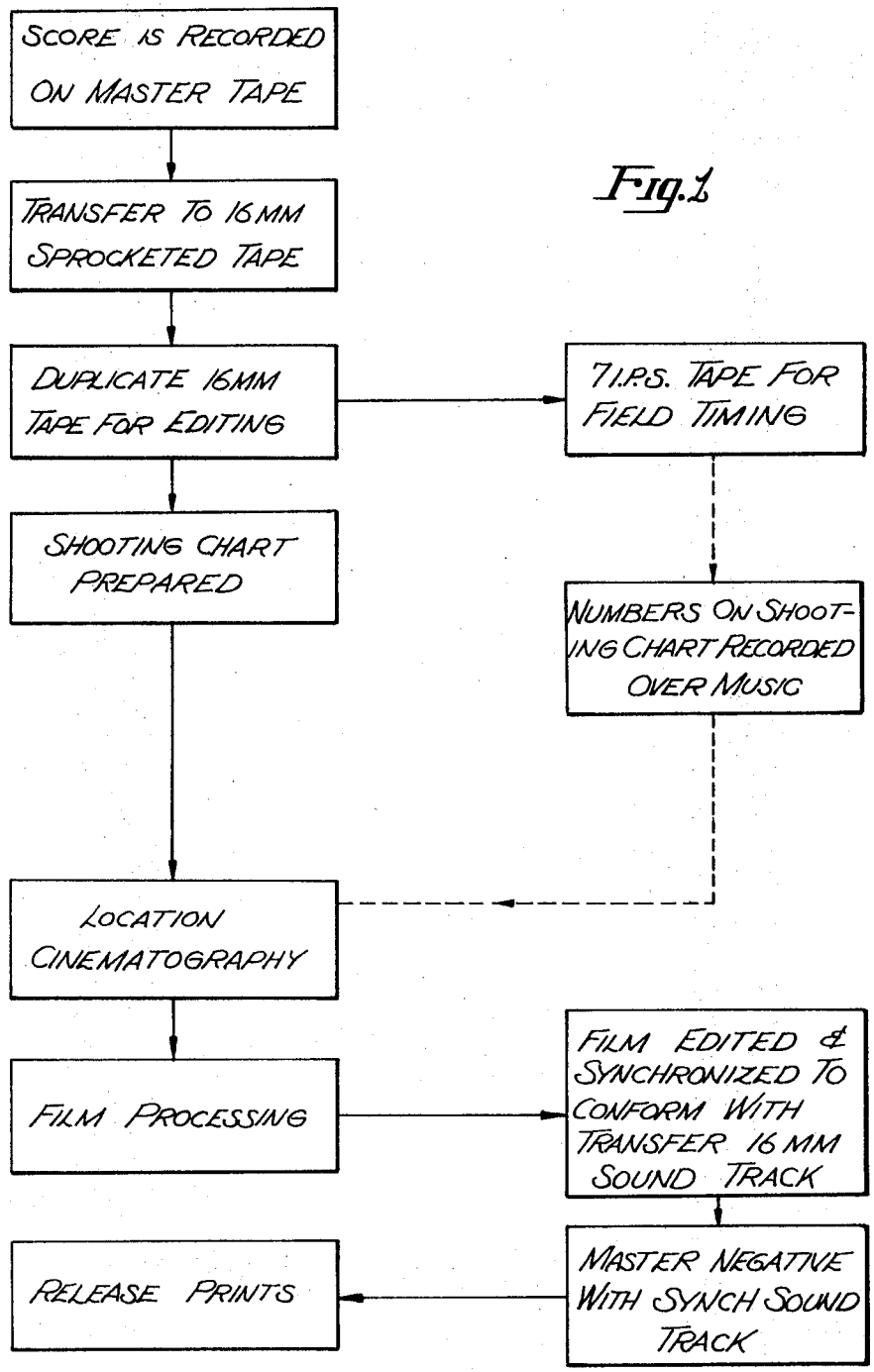
FIG. 1 is a flow chart illustrating the sequence of steps employed to implement the method of the invention.

Referring to FIG. 1 there is shown a flow chart listing the steps for carrying out the method of the invention. The musical composition is the fixed quantity and is given at the outset of the production.

A master one-quarter dual track magnetic tape recording is made of the musical composition or score.

Preferably this master recording is recorded at a tape speed of 15 inches per second. This master recording is transferred to 16 mm. sprocketed magnetic film. This runs at 24 frames a second and the production of the pictorial portion of the film is now permanently committed to this 16 mm. transfer recording. If another transfer were attempted at any other time, line voltage would necessarily be different and the total time of the recording would vary. Dealing with synchronization to an accuracy of one twenty-fourth of a second is required, thus it is necessary to work with this original transfer or the effect of the film will be unsatisfactory. The 16 mm. sprocketed tape assures a constant-speed positive drive, and permits the picture frames to be interlocked to the sound in a subsequent step of the process of the invention.

A duplicate of the 16 mm. magnetic track is then made which can be used in a film-editing machine of the type known to those versed in the art as a "Moviola."

Another tape, for field timing, is made on standard one-quarter inch tape which is to be played at 7 inches per second for use on a portable tape recorder. Arbitrary numbers are assigned on the shooting chart and are recorded over the music.

Shooting the pictorial scenes on locations then follows. The longer the section of music to be covered, the more necessary are the use of the portable tape recorder and the "field timing tape" to assure internal timing, which is of utmost importance.

Next, a series of individual pictorial shots expressing the mood, motion, and the tempo of the musical score, are planned and listed in association with a group of musical bars. If the duration of the musical element is 2 seconds or less, there is no camera action. Internal action of the musical score must appear on the screen, or the film will create a feeling which is detached from the musical score. Due to the complex nature of the score, alternatives following different parts—woodwinds in a certain section or cell;—may be planned so that in editing, some control may be kept over the tempo and direction of the film. Thusly, the shot may be planned following the woodwinds, and another one following the celli. In this way, an editing choice is made available.

Filming is done primarily as action related to the score. Physically, the scope of the camera action is: out, in, up, down, right, left and the subject matter itself. Each scene is planned, shot and edited for the purpose of expressing visually what is heard in the music. Each scene is related to form and orchestration of the music.

If the tonality of a score is cold, cold colors are used— whites, blues, grays, etc., as with the music of Sibelius and Liadov. With the music of Rimsky-Korsakov, which is lushly orchestrated and warm in character (like Hanson), the film will tend to predominate in warm colors. The score controls this and the screen action. If the score is violently agitated, so must the pictures be.

An important point arises here, that there is purposely never as much action on the screen as in the scores. By holding down the optical aspect (amount of action; beauty of shot), the film is not allowed to impinge or intrude on the score. Photographically, in all cases more could be done, but the score stands first and must be what is remembered. For instance, in using animals, they are kept just off the beat. This forces the listener's attention to the beat, because something is not quite right. On the beat, the sound and film simply synchronize, but just off the beat, tempo is driven home subconsciously.

There is no pictorial continuity or relationship from scene to scene if the film is run without the sound track. One can watch an old silent movie; there is a story. Here there is none and must not be one.

On return from shooting, the film is processed and duplicates made (the original being carefully stored and the duplicate, as with other films, used for editing.)

The "dupe" magnetic track is put on the left side of a "-Moviola" editing machine. It is marked throughout its length where changes are to take place in the film (on the exact frame). Next, the dupe film is entered and run concurrently through the machine to determine if the shot is acceptable. The machine is so constructed that synchronization can be moved forward and back until the action is right. If correct synchronization cannot be accomplished for any single sequence of the film, the whole effort is obviously wasted.

Starting with the first section of the music and the first shot, the film is put together.

Transition from scene to scene is extremely important. It can be done by "direct cut" (no gradual fadeout and in, but rather an abrupt change), or by fadeout, going to black on the screen, and fade-in, or by dissolve (gradual overlap until the scene which follows is alone on the screen).

If an extremely abrupt change in rhythm or mood takes place in the score, a direct cut is used. If a twisting feeling occurs in the score, a 12-frame dissolve is used. This scene change takes one-half second on the screen.

Normal dissolves take 2 seconds. If a long, sustained tone is occurring before a scene change and if filming has been properly covered in length, the period of the dissolve can be and is lengthened out to 6 seconds. This is also done wherever the predominant score feeling is flowing. In this way, the film flows also.

If a severable musical theme is ending and a new one about to start, and if it can be done in concert with the score without being optically disturbing, a fadeout to complete black is used, signifying the end of the old idea and the fade-in with the start of a new idea.

On occasion, an overlay is used: two pictures on the screen simultaneously to indicate two actions in the score. Overdone, this would be disturbing. A full third of the film's effectiveness is in the handling of specific type of dissolve to denote specific feelings. To obtain a leading effect (forward feeling) the film is purposely advanced ahead of the sound track.

A flow chart is shown in FIG. 1 illustrating the sequence of steps in producing the final film product. Also, there is set forth below a chart which illustrates the photo subject matter for each sequence of musical bars of "A LONDON SYMPHONY," Scherzo (Nocturne) (3rd Movement) by Vaughan Williams.

| Time | Instrumental Sound | Bar | Subject |
|---|---|---|---|
| :00 1st) :03 | Strings, Woodwinds | 1 | Fountain |
| :09 | Strings | 8 | Birds |
| :14 | Clarinet | 13 | Buckingham Palace |
| :23 | Woodwinds, Strings | 19 | Trafalgar Square |
|  | Oboe—Full Orchestra | 33 | Police and Traffic |

Table —Continued

| Time | Instrumental Sound | Bar | Subject |
|---|---|---|---|
| :32 | Strings |  | Children |
| :40 | Woodwinds to Full Orchestra | 36 | Horse—Hansom Cab |
| :49 | Full Orchestra Decrescendo |  | Night |
| :56 | French Horn Fugue | 39 | Parliament |
| 1:05 | Clarinet—Basson | 55–77 | Night |
| 1:14 | First 77 Bars Repeated | 1–77 | Repeat |
| 2:28 | Horn Entrance | 78 | Arches (3)— 1st) Crimean Arch; 2nd) Admirality; 3rd) Canada Gate |
| 2:40 | Woodwinds | 90 | Buttresses—Parliament |
| 2:50 | Flute | 125 | Police Waving Traffic |
| 2:57 | Woodwinds and Strings | 131 | Water to Parliament |
| 3:07 | Oboe | 144 | Relieving Horse Guard |
| 3:14 | Full Orchestra | 154 | Train |
| 3:32 | Horn, then Strings, Bassoons | 179 200 | Strollers by Lake Mouth Organ (Street Dancer) |
| 3:53 | Strings, Woodwinds | 206 | Dancers |
| 4:15 | Strings | 225 | Children |
| 4:21 | Flute | 239 | Birds |
| 4:14 | Celli | 247 | Nanny and Baby |
| 4:20 | Strings, Flute | 254 | Fountain |
| 4:45 | Strings, Woodwinds (same Melody as Bar 144) | 270 | Marchers |
|  | Strings, then Full Orchestra | 276 | Band |
| 5:03 | Brasses, Strings | 280 | Band Closeup |
| 5:12 | Goes down to Woodwinds | 288 | Fadeout Horses |
| 5:30 | Celli, Bass | 292 | Lake |
|  | Flute | 307 | Overlay |
|  | Harp | 335 |  |
| 6:44 | Horn, Flute, Bass, Celli | 349 | Tower Bridge |
| 7:03 | Celli, then Woodwinds | 359 | Parliament |
|  | Violin | 371 |  |
|  | Bassoon, Basses and Celli | 385 |  |

Summarizing, in the prior art, the picture tells a story and the music accompanying the story is secondary.

Since the story is the overriding consideration, the mood of the story cannot be changed as is the case of the present invention where the unrelated pictures may be changed to match the mood of the music. In the prior art the action is tightly timed to the music thereby directing the attention of the audience to the story and distracting them from the music. In the present invention one set of pictures is switched to another to conform with the changes in the music. To the extent that the pictures express the mood, the motion and tempo of the score do not detract from the educational value.

Pictures are a matter of interpretation; however, by following the defined method of the invention, the motion-picture producer may duplicate, insofar as the effectiveness of the teaching tool is concerned, a novel motion picture in accordance with the invention. Such a film will keep motions away from the music, focus the attention to the listener to listen to the beat because the motion is offbeat.

With incongruous motion the listener is forced to think about the music. The object is not to entertain but to gain the attention of the listener and to move the listener. The closest form of integration between music and action is practiced most obviously and consistently in cartoons and musicals. This close integration is the antithesis of the present invention.

It is generally recognized by educational authorities that the responsiveness of the brain to the eye is 22 times more powerful than the other senses. This applies generally to variable cadences on records such as music or reading of poetry.

Therefore, the considerations to be followed in selecting the film shots for particular bars of music are as follows:

1. Off cadence. 2. Logically related to the score, or to the composer, or his nationality, or atmosphere of the composition. 3. Following the composer's written explanation, when available (i.e., water, snow, etc.); otherwise it is imaginatively developed.

Figure 2:
FIG. 2 is a typical frame between bars 200 and 206 of the illustrated chart on "A London Symphony."
Figure 3:
FIG. 3 is a typical frame between bars 280 and 287 of the illustrated chart on "A London Symphony."

If the composer has been specific, the film is specific, i.e. in the Vaughan Williams composition hereinbefore referred to, at bar 200, the composer has stated that he was thinking of street dancers and street dancers appear in the film from between bars 200 to 224 as stated in the previously disclosed chart. The balance of the film is shot in London. In Handel, the four sections of the Water Music Suite have one aspect in common—water—and water appears throughout the film, even though associated first with animals, then a Chinese garden, and finally Niagara Falls. To illustrate the above, FIG. 2 shows a typical frame between bars 200 and 206 of the previously described chart which diagrams a portion of "A London Symphony," and FIG. 3 shows a typical frame between bars 280 and 287.

The changes in cadence, and mood, and introduction of the new musical thoughts and melodies, are pointed up by the nature of the scene. Let some changes in mood slip by so that the film is not too tightly tied to the score. There is no necessary relationship between one picture and the preceding or succeeding pictures. A minimum of 48 frames (total of 2 seconds) should be used for a mood. If the mood is less than this, let it go by because it would be optically disturbing to change the picture. A 2 second change is very uncommon. Use a maximum mood time length of 65 seconds (1,560 frames at 24 frames per second). This is the longest mood, that one can lead in from one to another mood to lead an audience with the film.

Thus, the finished film is open-ended film without narration. Each individual or group is allowed to respond in their own individual manner. Rather than teaching specifics of music, the invention provides an individual experience; no two individuals respond the same way.

What is claimed is:

1. A method of producing sound motion pictures for use in musical education comprising the steps of;
   placing an unaltered musical composition on the sound track of a sound motion-picture film;
   taking a series of separate motion-picture shots of isolated scenes, each of said shots comprising a group of successive frames which psychologically relate to the mood, motion and tempo of a discrete or severable musical theme portion of said composition represented by a plurality of successive musical bars;
   placing each shot on said film in a manner to synchronize the running time of said separate shot with the time duration of the corresponding theme portion which the shot expresses to produce a finished sound motion picture which optimizes the musical learning experience for teaching said composition to the listener; and
   making the visually expressed rhythm of each shot off the beat of the audible theme portion with which the shot is synchronized to force the listener to direct his attention to the audible rhythm and thereby listen to the music.

2. A method as defined in claim 1 including the step of selecting said shots so as to avoid pictoral continuity or visible action relationships in the scenes from shot to shot so that the pictorial illustrations of the shots lack story continuity which would otherwise misdirect the viewer's primary attention from the music to the scenes.

3. A method as defined in claim 2 including the step of making the time duration of the visual transition from shot to shot in a period of 6 seconds or less.

4. A method as defined in claim 2 including the step of making the visual transition from shot to shot in the form of a fadeout to complete black thereby signifying the end of the old audible theme portion and the fade-in signifying the start of a new audible theme portion.

5. A method as defined in claim 2 including the step of permitting selected sequential audible theme portions to slip by without separate associated scenes so that the combined audiovisual film presentation is not so tightly tied to the score as to significantly interfere with the optimal musical learning response of the viewer.

6. A method as defined in claim 2 including the step of synchronizing separate shots with only those different theme portions having a visual duration on the screen of between 2 and 65 seconds.

7. A method of making a sound motion-picture film, comprising the steps of:
   initially magnetically recording a complete musical composition comprising a plurality of severable musical themes onto a sprocketed magnetic tape;
   graphically charting the sequence and running time of each of the severable musical themes comprising said composition, while playing back the recording made on said sprocketed tape;
   preparing a duplicate magnetic tape recording from said recorded sprocketed tape for playback during on-location cinematography;
   preparing a sequentially developed schedule which is registered with respect to the charting of said musical theme running times, delineating a sequence of discrete pictorial scenes which psychologically relate to corresponding ones of said severable musical themes;
   thereafter photographing said sequence of discrete pictorial scenes, onto motion-picture film, in time consonance with the playback of said duplicate magnetic tape recording while audibly playing back said duplicate magnetic tape recording so as to establish time consonance between said scenes and said severable musical themes;
   processing the motion-picture film produced in said photographing step to produce an ordered sequence of finished motion pictures;
   editing and synchronizing said ordered sequence of finished motion pictures with said sprocketed magnetic tape so that the discrete pictorial scenes contained in said schedule conform in chronological sequence and time duration to corresponding ones of said severable musical themes as they exist in said complete musical composition; and
   thereafter producing a projection print having combined pictures and sound directly from said edited and synchronized motion pictures so as to preserve the music/scene relationships thereof, and wherein the integral sound track is substantially an unaltered replica of said recorded sprocketed magnetic tape.